(12) United States Patent
Haribhaskaran et al.

(10) Patent No.: US 11,039,193 B2
(45) Date of Patent: Jun. 15, 2021

(54) OPTIMIZING A RESOURCE USAGE PER CONVERSION FOR OFFSITE CONTENT

(71) Applicant: Microsoft Technology Licensing, LLC, Redmond, WA (US)

(72) Inventors: Alagu Sanjana Haribhaskaran, Redmond, WA (US); Shahriar Shariat Talkhoonche, Redmond, WA (US); Zhen Wang, Sunnyvale, CA (US); Yanbo Ma, San Jose, CA (US)

(73) Assignee: Microsoft Technology Licensing, LLC, Redwood Shores (CA)

( * ) Notice: Subject to any disclaimer, the term of this patent is extended or adjusted under 35 U.S.C. 154(b) by 0 days.

(21) Appl. No.: 16/457,567

(22) Filed: Jun. 28, 2019

(65) Prior Publication Data

US 2020/0413118 A1 Dec. 31, 2020

(51) Int. Cl.
*H04N 21/262* (2011.01)
*H04N 21/2343* (2011.01)
(Continued)

(52) U.S. Cl.
CPC ... *H04N 21/26233* (2013.01); *G06Q 30/0243* (2013.01); *G06Q 30/0244* (2013.01);
(Continued)

(58) Field of Classification Search
CPC ..... H04N 21/26233; H04N 21/234309; H04N 21/2402; H04N 21/26216; G06Q 30/0243; G06Q 30/0244
(Continued)

(56) References Cited

U.S. PATENT DOCUMENTS

| 2007/0078707 | A1* | 4/2007 | Axe | G06Q 30/02 |
| | | | | 705/14.41 |
| 2009/0327083 | A1* | 12/2009 | Mathew | G06Q 30/0273 |
| | | | | 705/14.69 |

(Continued)

OTHER PUBLICATIONS

Evans, David S. "The economics of the online advertising industry." Review of network economics 7, No. 3 (2008). (Year: 2008).*

*Primary Examiner* — Abdulkader M Alriyashi
(74) *Attorney, Agent, or Firm* — Hickman Becker Bingham Ledesma LLP

(57) ABSTRACT

Systems and methods for optimizing offsite content delivery are provided. A content request is received from a content exchange and multiple candidate content delivery campaigns are identified in response to the content request. A computerized method includes, for each candidate content delivery campaign, determining a resource usage per conversion on a particular content platform, determining a conversion rate on one or more third-party content platforms, and determining a conversion rate on the one or more third-party content platforms. The resource usage per impression is computed based on the resource usage per conversion, the resource usage per selection, and the conversation rate. A particular candidate content delivery campaign is selected from among multiple candidate content delivery campaigns based on the resource usage per impression and the particular candidate content delivery campaign is caused to be transmitted over a computer network to the content exchange.

20 Claims, 4 Drawing Sheets

(51) Int. Cl.
*H04N 21/24* (2011.01)
*G06Q 30/02* (2012.01)

(52) U.S. Cl.
CPC . *H04N 21/234309* (2013.01); *H04N 21/2402* (2013.01); *H04N 21/26216* (2013.01)

(58) Field of Classification Search
USPC .......................................................... 709/217
See application file for complete search history.

(56) References Cited

U.S. PATENT DOCUMENTS

2012/0158485 A1\* 6/2012 Ogawa ............... G06Q 30/0242
705/14.42
2018/0034745 A1\* 2/2018 Zhong ................... H04L 41/145

\* cited by examiner

OPTIMIZING A RESOURCE USAGE PER CONVERSION FOR OFFSITE CONTENT

TECHNICAL FIELD

The present disclosure relates to optimizing offsite electronic content delivery and, more particularly, to stabilizing a resource usage per conversion for offsite content to be comparable to a resource usage per conversion for onsite content.

BACKGROUND

A content delivery system publishes electronic content to users of the content delivery system. The electronic content may also be published as sponsored content through many third-party web applications and third-party mobile applications to users of the content delivery system. In some cases, users that are active onsite (the content delivery system) can be widely different from offsite users (such as users of third-party web applications or third-party mobile applications). Thus, performance metrics for the content delivery system may be very different from the performance metrics for the offsite third-party system. To make the offsite performance comparable with the onsite performance, a method to optimize the parity of the performance metrics of the content delivery system and the performance metrics of the offsite third-party system is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques for optimizing offsite content delivery based on a resource usage per conversion are described. One approach to optimize the offsite content delivery includes determining a resource usage per conversion for offsite and making the offsite resource usage per conversion comparable to an onsite resource usage per conversion.

The approach includes a computerized method for receiving a content request from a content exchange and identifying multiple candidate content delivery campaigns in response to the content request. The method further includes, for each candidate campaign, determining a resource usage per conversion on a particular content platform, determining a conversion rate on one or more third-party content platforms, and determining a conversion rate on the third-party content platforms. Based on the determined resource usage per conversion, the resource usage per selection, and the conversation rate, a resource usage per impression is computed.

Based on the computed resource usage per impression, a particular candidate content delivery campaign is selected from among the multiple candidate content delivery campaigns and the particular candidate content delivery campaign is caused to be transmitted over a computer network to the content exchange to be, possibly, displayed on a user device.

Embodiments described herein improve the utility of electronic content delivery methods in a computerized system by optimizing performance metrics of an offsite platform (third-party publisher system) to be comparable to performance metrics of an onsite platform (content delivery system). Embodiments involve imposing upper bounds and lower bounds of an optimization rate that is used to calculate a resource usage per conversion (cost per conversion) to optimize the delivery of content in a computer-related technology. Embodiments improve user experience by selecting a campaign with which the users are more inclined to interact based on the calculated resource usage per conversion and delivering the selected campaign to the users.

System Overview

Figure 1:
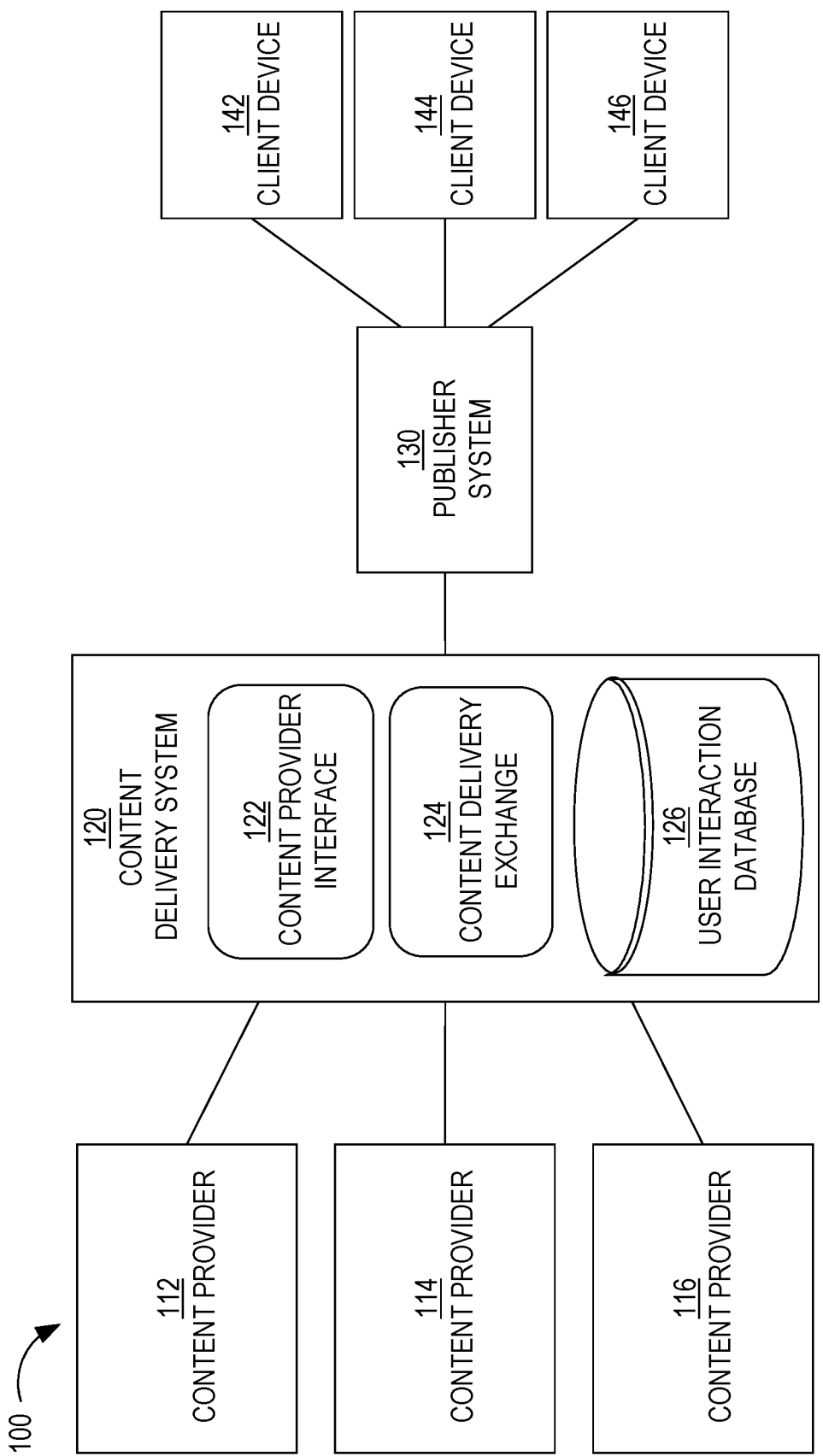
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders, includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may comprise combinations of multiple images, such as a carousel ad. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device. Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ or LinkedIn Audience Network™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, install a particular application, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users on one or more publishers. In an embodiment, a content delivery campaign defines who receives a content item and where in the sense that a content item is prevented from being displayed through one publisher application but is allowed to be displayed through another publisher application. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Some member characteristics may be generated using one or more machine learning techniques, in both features (e.g., "standardized" job titles) and in probabilistic (or confidence-based) member mapping from device ID (e.g., LiveRamp). Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per mille (thousand) impressions or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device), and publisher-specific filtering where a publisher can specify that it does not want content pertaining to certain categories displayed in its application and such a filter is honored by filtering those campaigns for that request. In a related embodiment, instead of relying sole on member attributes to identify users to target, activities in common with other user may be taken into account. For example, if user A clicked on the same (or similar) content item as user B who was targeted by campaign C, then user A may be targeted to campaign C, even though user A might not satisfy the targeting criteria of campaign C. Such an "expansion" of targeted users may be managed with a confidence score.

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction." In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content items, across client devices 152-156 (and other client devices not depicted). For example, content delivery system 120 determines whether a content item that content delivery exchange 124 delivers is presented at (e.g., displayed by or played back at) a client device. Such an "event" is referred to as an "impression." As another example, content delivery system 120 determines whether a content item that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item, content delivery system 120 may calculate a CTR for the content item.

Another type of event that content delivery system 120 may log is a win event, which is fired when a third-party exchange notifies content delivery system 120 in response to a content item selected by content delivery system 120 having won a content item selection event conducted by the third-party exchange. A win event does not necessarily guarantee that the content item will be presented by a third-party publisher since the third-party publisher might never present the content item.

Serving Pipeline

Figure 2:
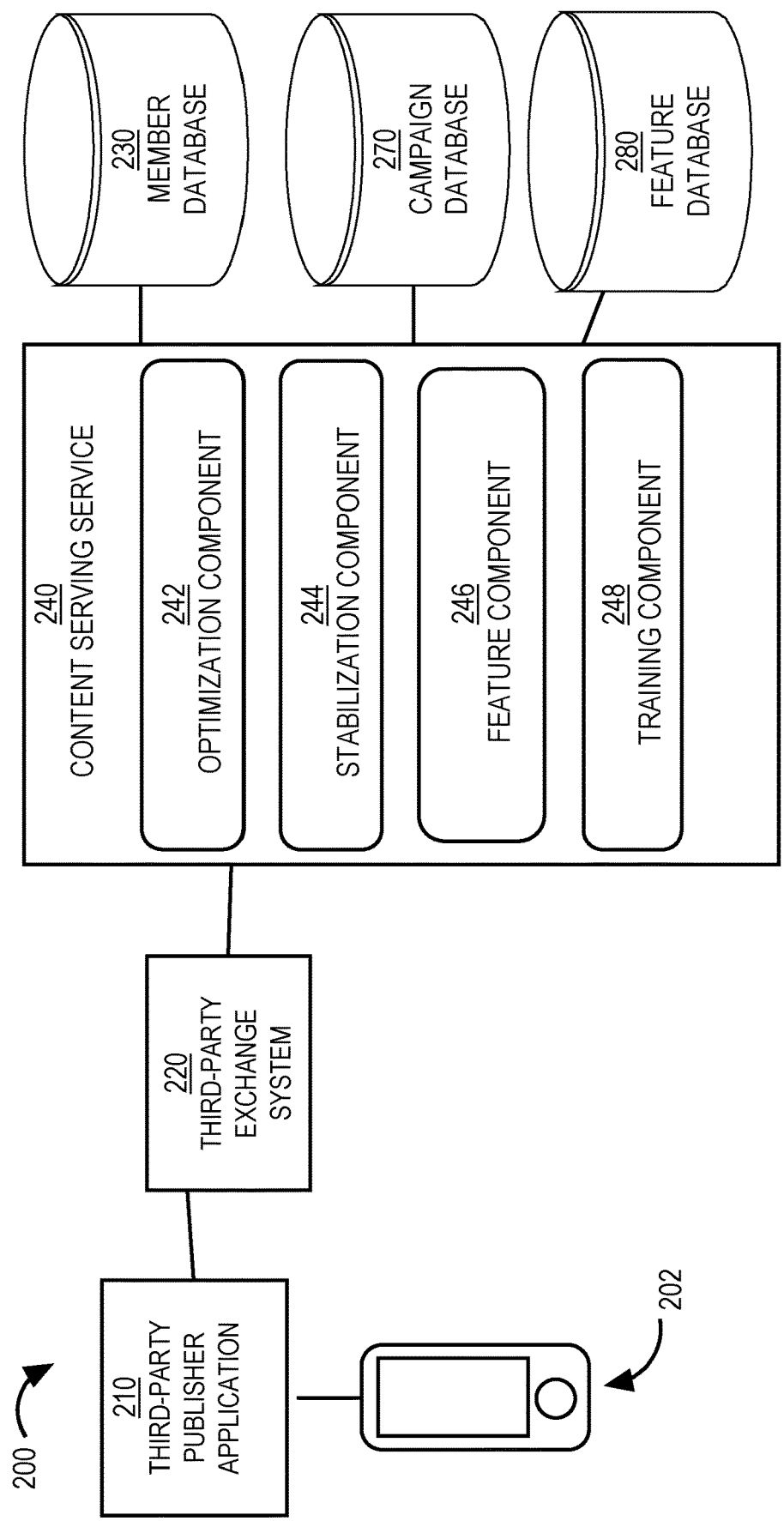
FIG. 2 is a block diagram that depicts an example serving pipeline for optimizing offsite content delivery, in an embodiment.

FIG. 2 is a block diagram that depicts an example serving pipeline 200 for optimizing offsite campaign delivery, in an embodiment. Content requests initiated by a client device 202 may come from a third-party publisher application 210.

Serving pipeline 200 includes a content serving service 240, a member database 230, a campaign database 270, and a feature database 280. Although only one third-party exchange system 220 and one third-party publisher application 210 are depicted, multiple third-party publisher applications maybe communicatively coupled to third-party exchange system 220 and multiple third-party exchange systems may be communicatively coupled (e.g., over a computer network, such as the Internet) to content serving service 240. Content delivery system 120 may include content serving service 240, member database 230, campaign database 270, and feature database 280.

Content serving service 240 receives, from third-party exchange system 220, one or more content requests initiated by third-party publisher application 210 executing on client device 202. A user operating client device 202 interacts with third-party publisher application 210 (e.g., provided by CNN) to initiate a content request. Third-party publisher application 210 sends the content request to third-party exchange system 220. In response, third-party exchange 220 transmits the content request (or generates a new content request based thereon and sends the new content request) to content serving service 240. The content request from third-party exchange 220 may include a publisher identifier that uniquely identifies a third-party publisher application, a member ID that uniquely identifies a user or a user account, a mobile identifier (MAID) that uniquely identifies the computing device operated by the user, a device ID (e.g., a MAC address) that uniquely identifies the computing device on which the third-party publisher application is executing, a cookie identifer, an IP address, and/or a GPS location. A user may be a registered entity (e.g., member) of an online service, such as a social network service. In response to the content request, third-party exchange system 220 receives content data and displays content associated with the content data on third-party publisher application 210 executing on client device 202.

Content Serving Service

Content serving service 240 includes an optimization component 242, a stabilization component 244, a feature component 246, and a training component 248. Processes implemented by components in content serving service 240 may be performed offline.

Content serving service 240 receives a content request and selects content (e.g., a content delivery campaign) based on an expected resource usage per impression (e.g. an effective cost per impression) generated by optimization component 242. An expected resource usage per impression score is an expected cost for every impression (eCPI) of a content item of a content delivery campaign to a user on a particular platform. In other words, an expected cost per impression indicates how much it will cost to deliver a content item of a campaign to a user on the particular platform.

Based on the expected cost per impression, a particular content delivery campaign is selected from among a set of candidate content delivery campaigns. The set of candidate content delivery campaigns is stored in campaign database 270. After the selection is made, a content item associated with the particular content delivery campaign may be displayed on client device 202.

Optimization Function

Optimization component 242 calculates an expected cost per impression (eCPI) for each candidate campaign. In some embodiments, an expected cost per impression for campaign i can be calculated according to:

$$eCPI_i = \alpha_i * bid_i * pCTR_i$$

where $\alpha_i$ denotes an optimization rate for campaign i, $bid_i$ denotes a bid price for campaign i, $pCTR_i$ denotes a predicted Click-Through Rate (CTR) for campaign i.

In one embodiment, a new alpha can be computed for every request that is received at content serving service 240. Some variables may be computed offline and transferred to online serving system while the final value may be computed online. In another embodiment, all the variables may be computed offline for each possible combination (campaign, publisher, user) including an alpha.

The bid price represents a bid amount for space on one or more third-party publisher systems, such as publisher system 130, to present content items on behalf of multiple content providers. The bid price for each campaign is stored in campaign database 270 or may be determined automatically by content delivery exchange 124. Predicted CTR is a prediction of a user interacting with a content item associated with the content delivery campaign. For example, a click-through rate of campaign i refers to a ratio of a number of clicks on any content items in campaign i to a total number of impressions of content items in campaign i. In general, a click-through rate of campaign i increases if users who are presented with one or more content items from campaign i frequently click on (or otherwise select or interact with) the content items in campaign i. The predicted CTR value for each campaign may be stored in campaign database 270 with campaign data and may be updated frequently or generated dynamically.

Optimization component 242 calculates an optimization rate using an optimization function. The optimization rate represents a ratio between a cost per conversion for offsite ($CPA^L$) and a cost per conversion for onsite ($CPA^F$). In this instance, superscript F refers to an onsite channel (e.g., Feed) and superscript L refers to an offsite channel. A cost per conversion is a cost that a content provider incurs for each conversion after displaying one or more content items. Example conversions include purchasing a product or service, downloading a software application, or filling out an online form. In some embodiments, a cost per conversion is denoted as a Cost Per Action (CPA) or a Cost Per Lead (CPL). An example of an optimization rate is produced below:

$$\alpha_i = \frac{eCPL_i^F}{eCPC_i^L} CVR_i^L$$

where $eCPL_i^F$ denotes an expected resource usage per conversion for onsite campaign i, $eCPC_i^L$ denotes an expected resource usage per selection (e.g., per click) for campaign i, $CVR_i^L$ denotes a conversion rate for campaign i, superscript F denotes an onsite channel (Feed), superscript L denotes an offsite channel, and subscript i denotes campaign i.

A conversion rate (CVR) is a percentage of impressions (presentations) of content items that result in a conversion. For example, a conversion rate is calculated by dividing the number of conversions that resulted from the content delivery campaign by the total number of times one or more content items of the campaign are presented to users ("impressions"). In some embodiment, a conversion rate can be a prediction or an estimation of a conversion rate.

A resource usage per selection (e.g., Cost Per Click/CPC) is a cost that a content provider incurs when a content item of a campaign is selected (e.g., clicked). For example, a resource usage per selection value is calculated by dividing (1) the cost for the selections (clicks) that resulted from displaying one or more content items of a content delivery campaign by (2) the total number of times the one or more content items were presented to users.

A resource usage per conversion (e.g., Cost Per Lead (CPL—another term for describing the CPA)) is a cost a content provider incurs each time a user performs a conversion in response to presentation of one or more content items in a content delivery campaign. A cost per lead for a campaign can be calculated by dividing a cost per action (conversion) by a number of impressions of one or more content items of the campaign.

Based on a conversion rate for campaign i ($CVR_i^L$), an expected resource usage per selection for campaign i ($eCPL_i^F$), an expected resource usage per conversion for offsite campaign i ($eCPC_i^L$), an optimization rate for campaign i ($\alpha_i$) is calculated. Using the optimization rate, optimization component 242 optimizes a cost per conversion value for offsite content. The optimization rate is constrained in a way that the cost per conversion for offsite is comparable to the cost per conversion for onsite. In some instances, the optimization rate remains within a range of one (1). By optimizing the performance metrics for the offsite platform to be comparable to the performance metrics for the onsite platform, it optimizes the conversion parity between the onsite platform and the offsite platform, making the offsite content delivery more efficient.

Hierarchical Structure

In some embodiments, a hierarchical structure of a content provider and a third-party publisher system can be implemented when computing an expected cost per click (eCPC) and an expected cost per conversion (eCPL) for each campaign. For example, there may be a large set of campaigns with no value or with very high noise (e.g., many offsite campaigns may be new and conversions/clicks can be rare). To stabilize the statistics, a hierarchical structure that transfers information of higher levels of hierarchy to the lower levels may be implemented. An example hierarchical structure is shown in table 1:

TABLE 1

Hierarchical structure for a content provider and a third-party publisher system

| Content Provider | Third-party publisher system |
|---|---|
| Overall | Overall |
| Entity segment (company) | Operating Systems (OS) |
| Content provider | Third-party publisher system category |
| Content delivery campaign | Third-party publisher system |

Table 1 shows the hierarchical structure from a higher level (top) to a lower level (bottom). Optimization component 242 can search from the lowest level of the hierarchy and stops searching for samples of clicks or conversions when enough number of samples are accumulated Optimization component 242 finds an appropriate level to an expected cost per click (eCPC) and an expected cost per conversion (eCPA) by starting from the lowest level (e.g., content delivery campaign) and determining whether enough samples of clicks or conversions have been accumulated. If not, then optimization component 242 moves up to the next higher level of content provider (e.g., advertiser) and determines whether enough samples have been accumulated. If enough samples are still not accumulated, then optimization component 242 moves up to the next higher level of company level or overall level according to table 1 to determine the appropriate level to an expected cost per click and an expected cost per conversion.

Each level in the hierarchy may correspond to a particular resource usage per conversion value of a plurality of resource usage per conversion values. For example, a first resource usage per conversion value corresponds to a first level in the hierarchy shown in TABLE 1 (e.g., campaign level) and a second resource usage per conversion value corresponds to a second level in the hierarchy (e.g., content provider level). Determining a resource usage per conversion includes determining a plurality of resource usage per conversion values at different levels which includes the first resource usage per conversion value and the second resource usage per conversion value. Implementing the hierarchical structure may be more effective when a campaign is newer and fewer clicks are received, thus making the hierarchical structure a multi-level process. In some embodiments, the thresholds for the samples of clicks or conversions for each level can be tuned and determined using a convex combination method.

A Convex Combination

A convex combination can be implemented to produce a cost per conversion value using a hierarchical structure. For example, the following equation can be used to calculate the cost per conversion value that implements the hierarchical structure.

$$cpl = \theta_{i,0} CPL_{i,0}^F + (1-\theta_{i,o})\theta_{i,1} CPL_{i,1}^F + \ldots + (1-\theta_{i,o}) \ldots (1-\theta_{i,j}) CPL_{i,j}^F$$

where $CPL_{i,j}$ denotes a cost per conversion of campaign i at level j where level j indicates a different level of hierarchy (j may start from zero), where $\theta_{i,j}$ is computed as:

$$\theta_{i,j} = \frac{\exp(\beta V_{i,j}^F) - 1}{\exp(\beta V_{i,j}^F)}$$

where v denotes a conversion and theta (θ) values are related to the number of samples collected from the lower levels.

To determine the theta value, beta (β) can be set at 0.3 for onsite (FEED) cost per conversion and 0.1 for offsite cost per conversion based on the average decay on the historical data. In one embodiment, the cost per conversion for offsite can be computed independently.

Stabilization Function

Stabilization component 244 calculates a particular optimization rate value associated with a particular member, a particular publisher system, and a particular campaign using a stabilization function. The stabilization function may be under the subject of the standardization that values may be stabilized based on the hierarchical structure. A stabilization function can be represented as follows:

$$\alpha_{i,j,k} = \min(\max(\min(\max(\gamma, \gamma_{lb}), \gamma_{ub}) p(v|\alpha_i, g_j, m_k), \alpha_{lb}), \alpha_{ub})$$

where α is alpha or the optimization rate for a certain campaign i, a certain publisher system j, and a certain member k, $\gamma_{lb}$ denotes a lower bound of gamma (γ), $\gamma_{ub}$ denotes an upper bound of γ, $\alpha_{ub}$ denotes an upper bound of alpha (α), $\alpha_{lb}$ denotes a lower bound of α, $\alpha_i$ denotes campaign i, $g_j$ denotes publisher system j, $m_k$ denotes member k, $p(v|\alpha_i, g_j, m_k)$ denotes a prediction or likelihood of a conversion given campaign i, publisher system j, and member k, where p(v|α,g,m) can be defined as:

$$p(v|\alpha, g, m) = CVR \ast CTR$$

Stabilization component 244 calculates gamma (γ) for the stabilization function. Gamma represents a ratio between a cost per conversion for a particular campaign rendered on an offsite platform and a cost per conversion for the particular campaign rendered on an onsite platform. For example, gamma can be computed as $eCPL_i^F/eCPC_i^L$. In some embodiments, an upper bound of gamma can be higher than $$\frac{eCPL_i^F}{eCPC_i^L}$$

and a lower bound of gamma can be lower than $$\frac{eCPL_i^F}{eCPC_i^L}$$

Optimizing Bounds-Constrained Objective Method

In an embodiment, stabilization component 244 determines bounds that are imposed on the stabilization function using a constrained objective method. The objective function is constructed based on a logloss of $\rho_v$ as a predictor for conversion and imposes a constraint on its magnitude. That is:

$$\text{MIN } h(p_v; \Theta)$$

$$st. |\bar{\alpha} - 1| < \varepsilon$$

where $h(p_v;\Theta)$ stands for a negative logloss of $\rho_v$ where a response is the conversion and samples are impressions with parameters $\Theta = (\alpha_{ub}, \alpha_{lb}, \gamma_{ub}, \gamma_{lb})$ and ε controls a tolerance for the deviation of the optimization rate from 1.

In some embodiments, the objective function can be optimized. For example, pCVR is a predicted conversion rate given a click using a logistic regression model and pCTR is a predicted click-through rate given an impression using a logistic regression model. Both pCVR and pCTR optimize a logloss function, making the product of pCVR and pCTR an optimal predictor for conversion.

Similar to CTR, $\rho_v$ follows a heavy tail log-normal distribution that clipping the optimization rate (adjustment factor) would reduce the discriminative power of $\rho_v$ more rapidly. Thus, it may be observed from the data that the natural lower bound of gamma (γ) is stable and can be fixed around 0.3. To find an upper bound of gamma, the below equation can be used:

$$f(\gamma_{ub}) = \frac{1}{N} \sum_{i=1}^{N} \min(\gamma, \gamma_{ub}) p(v|a_i, g_j, m_k) - (1 - \epsilon)$$

Using the above equation and one or more root-finding methods such as a Newton-Raphson method, an appropriate upper bound for gamma can be determined. Once the upper bound of gamma is determined (bounded), a histogram bounding algorithm can be used to determine an upper bound and a lower bound of alpha. A histogram bounding algorithm is a dynamic programming algorithm that limits the upper bound and the lower bound of alpha. A histogram of $\alpha_v$ is constructed as:

$$\alpha_v = \min(\gamma, \gamma_{ub}) p(v|\alpha_i, g_j, m_k)$$

Using $\alpha_v$ and the histogram bounding algorithm, an upper bound and a lower bound of alpha is computed. In some embodiments, an optimization rate (alpha) can be computed for each campaign and alpha values for corresponding campaigns may be different from one another.

An example histogram bounding algorithm for calculating an upper bound and a lower bound is reproduced below:

| Algorithm 1 Histogram Bounding Algorithm |
|---|
| 1: procedure FINDRANGE(h :Histogram of $\alpha_v$ with n bins) |
| 2:     $h_{admitted}$ = bins with centers close to 1.0 |
| 3:     $C_{table} = \{0\}^{n \times n}$ |
| 4:     while i < $i_{max}$ do |
| 5:         $\alpha_{lb}$ = MIN (Ind ($h_{admitted}$)) ▷ Set of indices of histogram |
| 6:         $\alpha_{ub}$ = MAX (Ind ($h_{admitted}$)) |
| 7:         C [$\alpha_{lb}, \alpha_{ub}$] = E($h_{admitted}$) ▷ Expectation of a portion of histogram |
| 8:         if \|C [$\alpha_{lb}, \alpha_{ub}$] − 1\| < ε then |
| 9:             $h_{admitted} = h_{admitted} \cup \{\alpha_{lb} - 1, \alpha_{ub} + 1\}$ |
| 10:        else if C [$\alpha_{lb}, \alpha_{ub}$] > 1 + ε then |
| 11:             $C_u = C [\alpha_{lb}, \alpha_{ub} - 1]$ |
| 12:             $C_l = C [\alpha_{lb} - 1, \alpha_{ub}]$ |
| 13:        else |
| 14:             $C_u = C [\alpha_{lb}, \alpha_{ub} + 1]$ |
| 15:             $C_l = C [\alpha_{lb} + 1, \alpha_{ub}]$ |
| 16:        end if |
| 17:        if $C_u > 0$ and $C_l > 0$ then |
| 18:             Set $h_{admission}$ according to MIN(C[$\alpha_{lb}, \alpha_{ub}$], $C_u$, $C_l$) |
| 19:             $\alpha_{lb}$ = MIN (Ind ($h_{admitted}$)) |
| 20:             $\alpha_{ub}$ = MAX (Ind ($h_{admitted}$)) |
| 21:             Return |
| 22:        else if $C_u > 0$ then |
| 23:             Set $h_{admission}$ according to MIN(C[$\alpha_{lb}, \alpha_{ub}$], $C_u$) |
| 24:        else if $C_l > 0$ then |
| 25:             Set $h_{admission}$ according to MIN(C[$\alpha_{lb}, \alpha_{ub}$], $C_l$) |
| 26:        end if |
| 27:     end while |
| 28: end procedure |

In the histogram bounding algorithm, a histogram of the bins is created. For example, a mean value of alpha can be set to a constant number (e.g., 1) and bins that are closest to the mean value is determined. While maintaining the same mean value, the bins can be expanded to find a largest possible range. If the expansion goes beyond the mean value (e.g., 1.5), then the bins can be shifted to stay within the range of the mean value. Bins that meet the tolerance level are selected.

$h_{admitted}$ creates a set of bins within the histogram that are close to one (1) and indexes the bins that have been admitted (x-axis represents $\alpha_v$ and y-axis represents the count of impression). The minimum and maximum values of the $h_{admitted}$ are used to find the bounds of the bins and the values of the bins are determined to ensure that the bins are within the tolerance level specified in the algorithm. For example, $h_{admitted}$ can include a set of candidate bins that includes a bin to the left and a bin to the right, at least including three bins in the candidate set.

Expected bounds for the bins are computed and assigned to parameter C. The expected value is determined to see if it is within the tolerance range defined by the algorithm related to an epsilon value. If the value is not within the bound, then the bins are shifted (either getting rid of the bin that has exceeded the tolerance level or shrinks the bin size). After a number of iterations, an upper bound and a lower bound of alpha are determined.

Conversion Prediction Model Features

In some embodiments, historical data is used to generate feature values for predicting a conversion rate (CVR) for each content delivery campaign. As noted previously, CVR is a component in the equation to compute alpha ($\alpha$). Feature component 244 identifies features and computes feature values. Non-limiting examples of features include a conversion rate of an offsite publisher system, a conversion rate of an onsite content delivery campaign, a conversion rate of an offsite content delivery campaign, an identity of candidate content delivery campaign, a user associated with a content request, a publisher that the user visited to trigger the content request, a type of an Operating System (OS) of a computing device that initiated the content request, and/or an identity of a content exchange. The features and feature values are stored in feature database 280.

In some embodiments, training component 248 calculates a CVR value using the conversion prediction model. A CVR value and other performance metrics, such as an expected resource usage per selection and an expected resource usage per conversion, can be used to calculate an optimization rate (alpha). An optimization rate is applied to a bid and a predicted click-through rate to compute an expected cost per impression to optimize offsite electronic content delivery.

Different third-party exchange systems have different exchange IDs, different publisher systems have different third-party publisher IDs, different content delivery campaigns have different campaign IDs, different OSs (e.g., Android, iOS) have different IDs, and different entities have different member IDs. The features values are inputted into a machine-learned model, such as Logistic Regression model, to determine a conversion rate of each candidate content delivery campaign. For example, data associated with a set of the feature values is input to the machine-learned model to produce a predicted conversion rate value.

Training component 252 uses one or more machine learning techniques to train a machine-learned prediction model based on a set of historical data of feature values. Non-limiting examples of machine learning techniques to train a prediction model include Logical Regression, Naïve Bayes, Linear Regression, Support Vector Machines (SVMs), Random Forest (RF), and Artificial Neural Networks (ANNs).

Process Overview

Figure 3:
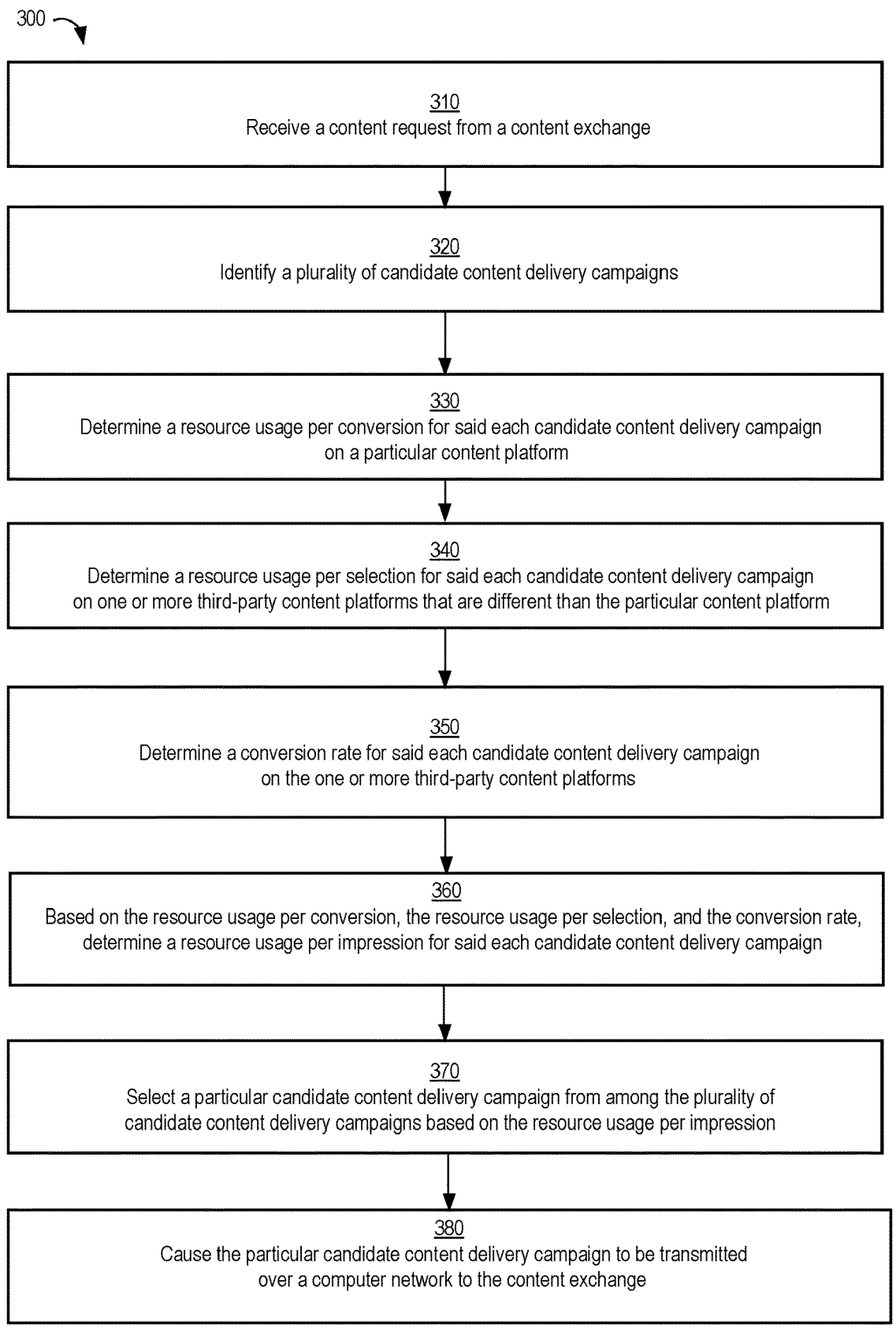
FIG. 3 is a flow diagram that depicts a process for optimizing a resource usage per conversion for offsite content delivery campaigns, in an embodiment.

FIG. 3 is a flow diagram that depicts a process for optimizing offsite campaign delivery, in an embodiment. Process 300 may be implemented by content serving service 240.

At block 310, content serving service 240 receives a content request from third-party exchange system 220. The content request is triggered by an initial content request from third-party publisher application 210 that is executed on client device 202 and that transmits the initial request over a computer network to third-party exchange system 220. The content request may be an HTTP request whose source address is that of third-party exchange system 220 and includes information about the content request, such as an identity of a publisher application, a member ID, or an IP address of client device 202.

At block 320, content serving service 240 identifies a plurality of content delivery campaigns based on the content request. Block 320 may involve identifying an entity identifier associated with the content request and calling campaign database 270 for one or more candidate campaigns that are associated with the content request or the identified entity identifier. Campaign database 270 stores association data between entities and campaigns, and interaction history of an entity with respect to one or more campaigns such as whether an entity has seen a particular campaign, whether the entity has clicked on a content item of the particular campaign, or the entity otherwise interacted with the particular campaign. At block 330, for each candidate content delivery campaign of the plurality of candidate content delivery campaigns, content serving service 240 determines a resource usage per conversion on a particular content platform. An example of the particular content platform is an onsite content delivery system (e.g., content serving service 240). The resource usage per conversion can be an expected value that may decrease the optimization rate if the CVR value decreases. As noted previously, the resource usage per conversion can be calculated using the following equation:

$$cpl = \theta_{i,0}CPL_{i,0}^F + (1-\theta_{i,0})\theta_{i,1}CPL_{i,1}^F + \ldots + (1-\theta_{i,0})\ldots(1-\theta_{i,j})CPL_{i,j}^F$$

At block 340, for each candidate content delivery, content serving service 240 determines a resource usage per selection (e.g., eCPC) for each candidate content delivery campaign on one or more third-party content platforms that are different than the particular content platform. As shown in Table 1, the resource usage per selection can be calculated using a hierarchical structure of a third-party publisher system and a content provider. Based on the hierarchical structure, an appropriate level to calculate the resource usage per selection can be determined.

At block 350, for each candidate content delivery, content serving service 240 determines a conversion rate on the one or more third-party content platforms. In general, an optimization rate may increase if the conversion rate increases. For example, the conversion rate (e.g., CVR) is computed using the machine-learned conversion prediction model described previously.

At block 360, for each campaign in the identified set of campaigns, content serving service 240 determines an effective resource usage per impression (e.g., eCPI) based on the resource usage per conversion, the resource usage per selection, and the conversion rate. Block 360 involves computing an optimization rate (α) using the determined values from block 330, block 340, and block 350. The optimization rate is multiplied by a bid amount and a predicted CTR value to compute an effective resource usage per impression that is used to select a content delivery campaign.

At block 370, a particular campaign is selected from the plurality of content delivery campaigns based on the effective resource usage per impression. For example, the content delivery campaign with the highest effective resource usage per impression is selected.

At block 380, in response to selecting the particular campaign, a content item of the particular campaign is caused to be transmitted to third-party exchange system 220 over a computer network. Third-party exchange system 220 may transmit the content item associated with the particular campaign to third-party publisher application 210 (or directly to client device 202) for display. As a result, the content item of the selected campaign is caused to be displayed on a screen of client device 202.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
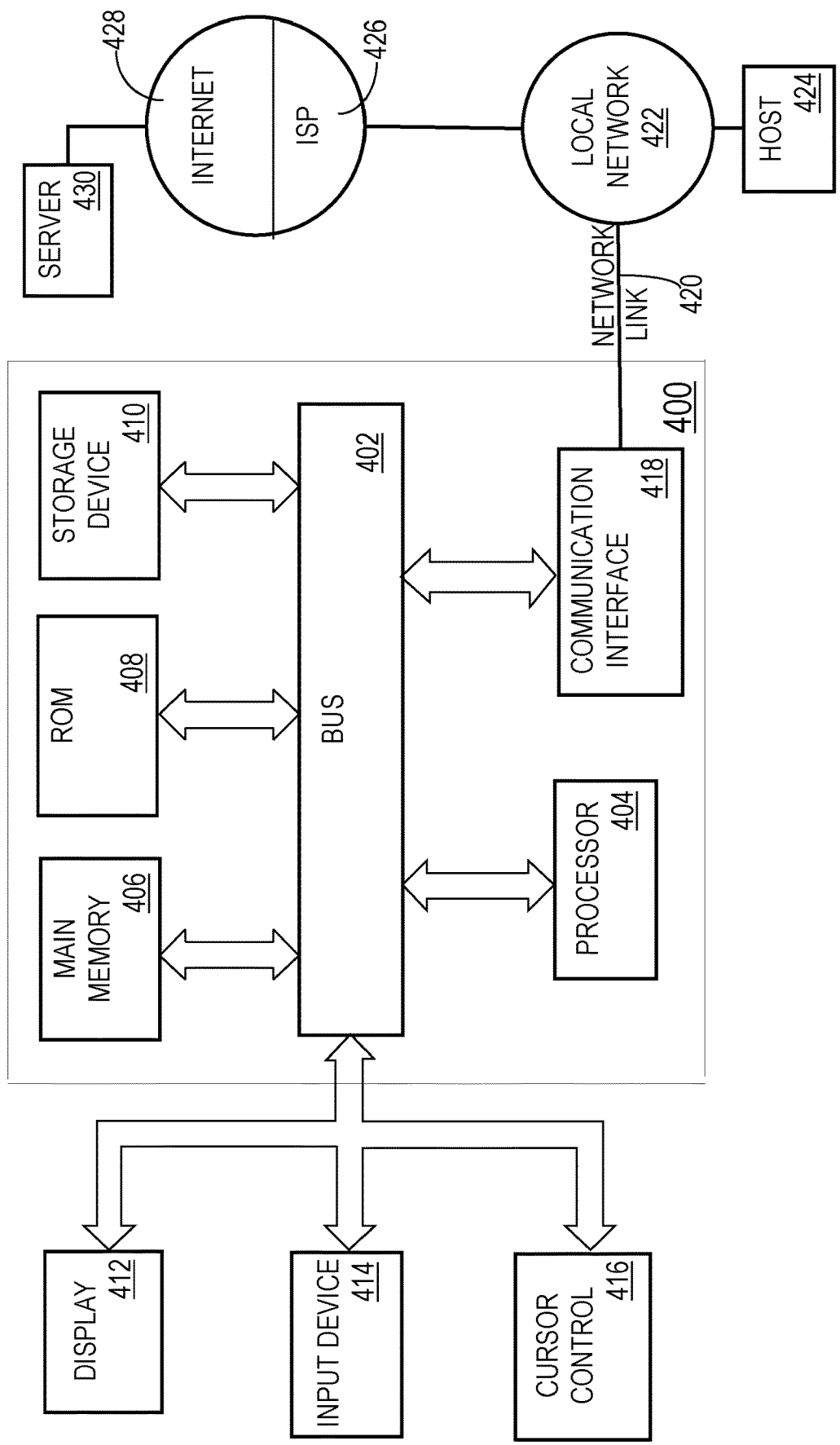
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

A cache is included as part of the main memory 406/ storage components. The cache may be implemented using any conventional, sufficiently fast technology, such as by using one or more flash memory devices, random access memory, a portion of main memory, etc. The cache may be implemented as a Solid-State Disk (SSD) or a as a module on the server. Cache memory is read and written to store the HTML content generated at URL inference service 140.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a content request from a content exchange;
   in response to receiving the content request from the content exchange:
      identifying a plurality of candidate content delivery campaigns;
      for each candidate content delivery campaign of the plurality of candidate content delivery campaigns:
         determining a resource usage per conversion for said each candidate content delivery campaign on a particular content platform;
         determining a resource usage per selection for said each candidate content delivery campaign on one or more third-party content platforms that are different than the particular content platform;
         determining a conversion rate for said each candidate content delivery campaign on the one or more third-party content platforms;
         based on the resource usage per conversion, the resource usage per selection, and the conversion rate, determining a resource usage per impression for said each candidate content delivery campaign;
      selecting a particular candidate content delivery campaign from among the plurality of candidate content delivery campaigns based on the resource usage per impression determined for each candidate content delivery campaign;
      causing the particular candidate content delivery campaign to be transmitted over a computer network to the content exchange;
   wherein the method is performed by one or more computing devices.

2. The method of claim 1, wherein determining the resource usage per conversion comprises determining a plurality of resource usage per conversion values, wherein a first resource usage per conversion value of the plurality of resource usage per conversion values corresponds to a first level in a hierarchy and a second resource usage per conversion value of the plurality of resource usage per conversion values corresponds to a second level in the hierarchy.

3. The method of claim 2, wherein:
   determining the resource usage per conversion comprises determining a first value based on a first number of conversions at the first level in the hierarchy and a second value based on a second number of conversions at the second level in the hierarchy;
   the method further comprising:
      determining a first product of the first value and the first resource usage per conversion value;
      determining a second product of the second value and the second resource usage per conversion value;
   the resource usage per conversion is based on the first product and the second product.

4. The method of claim 1, wherein determining the conversion rate of said each candidate content delivery campaign comprises inputting, into a machine-learned model, a plurality of features values corresponding to a plurality of features comprising two or more of an identity of said each candidate content delivery campaign, a user associated with the content request, a publisher that the user visited to trigger the content request, a type of operating system of a computing device operated by the user, or an identity of the content exchange.

5. The method of claim 1, wherein a particular value that is based on the resource usage per conversion, the resource usage per selection, and the conversion rate is within an upper bound value and a lower bound value, the method further comprising:
   using a histogram bounding algorithm to determine the upper bound value and the lower bound value;
   wherein a histogram that is used to determine the upper bound value and the lower bound value is based on a set of alpha values, each of which is based on a product of (1) a predicted conversion rate and (2) a minimum of an observed gamma and an upper bound of gamma.

6. The method of claim 5, wherein the gamma is determined based on a resource usage per conversion for a certain candidate content delivery campaign on the one or more third-party content platforms and a resource usage per conversion for the certain candidate content delivery campaign on the particular content platform.

7. The method of claim 1, wherein an optimization rate is determined based on the resource usage per conversion, the resource usage per selection, and the conversion rate, wherein the optimization rate ensures that the resource usage per conversion for the one or more third-party content platforms is within a pre-defined range of the resource usage per conversion for the particular content platform.

8. One or more non-transitory computer-readable storage media storing instructions that, when executed by one or more processors, perform a method comprising:
receiving a content request from a content exchange;
in response to receiving the content request from the content exchange:
identifying a plurality of candidate content delivery campaigns;
for each candidate content delivery campaign of the plurality of candidate content delivery campaigns:
determining a resource usage per conversion for said each candidate content delivery campaign on a particular content platform;
determining a resource usage per selection for said each candidate content delivery campaign on one or more third-party content platforms that are different than the particular content platform;
determining a conversion rate for said each candidate content delivery campaign on the one or more third-party content platforms;
based on the resource usage per conversion, the resource usage per selection, and the conversion rate, determining a resource usage per impression for said each candidate content delivery campaign;
selecting a particular candidate content delivery campaign from among the plurality of candidate content delivery campaigns based on the resource usage per impression determined for each candidate content delivery campaign;
causing the particular candidate content delivery campaign to be transmitted over a computer network to the content exchange.

9. The one or more non-transitory computer-readable storage media of claim 8, wherein determining the resource usage per conversion comprises determining a plurality of resource usage per conversion values, wherein a first resource usage per conversion value of the plurality of resource usage per conversion values corresponds to a first level in a hierarchy and a second resource usage per conversion value of the plurality of resource usage per conversion values corresponds to a second level in the hierarchy.

10. The one or more non-transitory computer-readable storage media of claim 9, wherein:
determining the resource usage per conversion comprises determining a first value based on a first number of conversions at the first level in the hierarchy and a second value based on a second number of conversions at the second level in the hierarchy;
the method further comprising:
determining a first product of the first value and the first resource usage per conversion value;
determining a second product of the second value and the second resource usage per conversion value;
the resource usage per conversion is based on the first product and the second product.

11. The one or more non-transitory computer-readable storage media of claim 8, wherein determining the conversion rate of said each candidate content delivery campaign comprises inputting, into a machine-learned model, a plurality of features values corresponding to a plurality of features comprising two or more of an identity of said each candidate content delivery campaign, a user associated with the content request, a publisher that the user visited to trigger the content request, a type of operating system of a computing device operated by the user, or an identity of the content exchange.

12. The one or more non-transitory computer-readable storage media of claim 8, wherein a particular value that is based on the resource usage per conversion, the resource usage per selection, and the conversion rate is within an upper bound value and a lower bound value, the method further comprising:
using a histogram bounding algorithm to determine the upper bound value and the lower bound value;
wherein a histogram that is used to determine the upper bound value and the lower bound value is based on a set of alpha values, each of which is based on a product of (1) a predicted conversion rate and (2) a minimum of an observed gamma and an upper bound of gamma.

13. The one or more non-transitory computer-readable storage media of claim 12, wherein the gamma is determined based on a resource usage per conversion for a certain candidate content delivery campaign on the one or more third-party content platforms and a resource usage per conversion for the certain candidate content delivery campaign on the particular content platform.

14. The one or more non-transitory computer-readable storage media of claim 8, wherein an optimization rate is determined based on the resource usage per conversion, the resource usage per selection, and the conversion rate, wherein the optimization rate ensures that the resource usage per conversion for the one or more third-party content platforms is within a pre-defined range of the resource usage per conversion for the particular content platform.

15. A system comprising:
a processor; and
a memory storing instructions that, when executed by the processor, cause the processor to perform a method comprising:
receiving a content request from a content exchange;
in response to receiving the content request from the content exchange:
identifying a plurality of candidate content delivery campaigns;
for each candidate content delivery campaign of the plurality of candidate content delivery campaigns:
determining a resource usage per conversion for said each candidate content delivery campaign on a particular content platform;
determining a resource usage per selection for said each candidate content delivery campaign on one or more third-party content platforms that are different than the particular content platform;
determining a conversion rate for said each candidate content delivery campaign on the one or more third-party content platforms;

based on the resource usage per conversion, the resource usage per selection, and the conversion rate, determining a resource usage per impression for said each candidate content delivery campaign;

selecting a particular candidate content delivery campaign from among the plurality of candidate content delivery campaigns based on the resource usage per impression determined for each candidate content delivery campaign;

causing the particular candidate content delivery campaign to be transmitted over a computer network to the content exchange.

16. The system of claim 15, wherein determining the resource usage per conversion comprises determining a plurality of resource usage per conversion values, wherein a first resource usage per conversion value of the plurality of resource usage per conversion values corresponds to a first level in a hierarchy and a second resource usage per conversion value of the plurality of resource usage per conversion values corresponds to a second level in the hierarchy.

17. The system of claim 16, wherein:
determining the resource usage per conversion comprises determining a first value based on a first number of conversions at the first level in the hierarchy and a second value based on a second number of conversions at the second level in the hierarchy;
the method further comprising:
determining a first product of the first value and the first resource usage per conversion value;
determining a second product of the second value and the second resource usage per conversion value;
the resource usage per conversion is based on the first product and the second product.

18. The system of claim 15, wherein determining the conversion rate of said each candidate content delivery campaign comprises inputting, into a machine-learned model, a plurality of features values corresponding to a plurality of features comprising two or more of an identity of said each candidate content delivery campaign, a user associated with the content request, a publisher that the user visited to trigger the content request, a type of operating system of a computing device operated by the user, or an identity of the content exchange.

19. The system of claim 15, wherein a particular value that is based on the resource usage per conversion, the resource usage per selection, and the conversion rate is within an upper bound value and a lower bound value, the method further comprising:
using a histogram bounding algorithm to determine the upper bound value and the lower bound value;
wherein a histogram that is used to determine the upper bound value and the lower bound value is based on a set of alpha values, each of which is based on a product of (1) a predicted conversion rate and (2) a minimum of an observed gamma and an upper bound of gamma.

20. The system of claim 19, wherein the gamma is determined based on a resource usage per conversion for a certain candidate content delivery campaign on the one or more third-party content platforms and a resource usage per conversion for the certain candidate content delivery campaign on the particular content platform.

* * * * *

UNITED STATES PATENT AND TRADEMARK OFFICE
CERTIFICATE OF CORRECTION

PATENT NO. : 11,039,193 B2
APPLICATION NO. : 16/457567
DATED : June 15, 2021
INVENTOR(S) : Alagu Sanjana Haribhaskaran et al.

Page 1 of 1

It is certified that error appears in the above-identified patent and that said Letters Patent is hereby corrected as shown below:

On the Title Page

(72) Inventors:
Inventor #1:
Alagu Sanjana Haribhaskaran - Please delete "Redmond, WA" and insert --San Francisco, CA--.
Inventor #2:
Shahriar Shariat Talkhoonche - Please delete "Redmond, WA" and insert --Orinda, CA--.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*